United States Patent
Gowker

(10) Patent No.: US 8,573,906 B2
(45) Date of Patent: Nov. 5, 2013

(54) DRILL GUIDE APPARATUS

(75) Inventor: James Anthony Gowker, Knoxville, TN (US)

(73) Assignee: James Anthony Gowker, Knoxville, TN (US)

( * ) Notice: Subject to any disclaimer, the term of this patent is extended or adjusted under 35 U.S.C. 154(b) by 716 days.

(21) Appl. No.: 12/804,020

(22) Filed: Jul. 12, 2010

(65) Prior Publication Data
US 2012/0009035 A1 Jan. 12, 2012
US 2012/0195705 A9 Aug. 2, 2012

Related U.S. Application Data

(63) Continuation of application No. 12/799,815, filed on May 3, 2010, now abandoned.

(60) Provisional application No. 61/215,498, filed on May 6, 2009.

(51) Int. Cl.
*B23B 49/02* (2006.01)

(52) U.S. Cl.
USPC .................................. 408/115 R; 408/80

(58) Field of Classification Search
USPC ........... 408/72 R, 79–83.5, 97, 115 R, 115 B, 408/72 B
IPC ....................................................... B23B 49/02
See application file for complete search history.

(56) References Cited

U.S. PATENT DOCUMENTS

| | | | | | |
|---|---|---|---|---|---|
| 2,601,809 | A | * | 7/1952 | Di Nardo | 408/83.5 |
| 2,787,196 | A | * | 4/1957 | Stadler | 408/83.5 |
| 3,011,369 | A | * | 12/1961 | Russell | 408/80 |
| 3,992,122 | A | * | 11/1976 | Maxey | 408/72 B |
| 4,579,485 | A | * | 4/1986 | Connor et al. | 408/115 R |
| 4,705,436 | A | * | 11/1987 | Robertson | 408/72 R |
| 4,964,475 | A | * | 10/1990 | Fischer | 175/210 |
| 5,126,908 | A | * | 6/1992 | Casari et al. | 360/137 |
| 5,375,949 | A | * | 12/1994 | McHenry, Jr. | 408/1 R |
| 5,454,245 | A | * | 10/1995 | Markisello | 70/252 |
| 6,824,335 | B2 | * | 11/2004 | Lynch | 408/115 R |
| 2005/0204542 | A1 | * | 9/2005 | Pittman | 29/566 |

* cited by examiner

*Primary Examiner* — Daniel Howell

(57) ABSTRACT

This invention relates to a drill guide apparatus for use in drilling holes in wood and other material in conjunction with spade drills. When deeper holes are required, the invention will also utilize drill extension rods. The embodiment consists of 4 separate guides assembled together which make a hole as parallel and perpendicular as possible to the work piece. One of these guides, the insert guide, acts as a stabilizer that helps keep the drill from drifting and wobbling. The guide shaft lines up with the work piece and starts the parallel course. When the spacer and base plate lay up against the work piece, the spade drill will travel in a perpendicular course. The spade drill and drill extension rod are prior art and are readily available in the market place.

1 Claim, 8 Drawing Sheets

DRILL GUIDE APPARATUS

CROSS REFERENCE TO RELATED APPLICATIONS

This application is a continuation of U.S. patent application Ser. No. 12/799,815, filed May 3, 2010 now abandoned, which claimed the benefit under 35 U.S.C. section 119(e) of U.S. Provisional Application Ser. No. 61/215,498, filed May 6, 2009.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

1. Field of Invention

This invention relates to a drill guide apparatus which keeps spade drills and drill extension rods on a straight course while drilling deep holes. Thus it prevents the drill from wobbling and drifting.

2. Description of the Related Art

In general, craftsmen in the carpentry trade have been using two types of tools to drill holes. One is a hole saw, and the other is the spade drill.

Customarily, the hole saw is used for holes one inch and larger. However, hole saws do come in smaller sizes. When holes from $\frac{1}{4}$" of an inch up to $1\frac{1}{2}$" are desired, the spade drill is utilized. These tools differ in form, but they both, basically, have the same function. This function is to make a perfectly round hole in wood and other material. The spade drill has an advantage over the hole saw because of its design. Unlike the hole saw, the spade drill is able to use a drill extension rod and thus drill deeper holes. Conversely, the cup design of the hole saw limits the depth of the hole to about two inches. If attempting to saw more than two inches deep, you will be forced to remove the plug that is left in the hole saw. This invention, the drill guide apparatus, is used in conjunction with the spade drill; so that it will be the main focus. The spade drill has been around for many years with U.S. Pat. No. 2,782,824 issued February, 1957; and U.S. Pat. No. 2,794,468 issued June, 1957. Since the time that these patents were given, the spade drill has not changed appreciably; and has been serving carpenters as a tool that is reliable. There are, however, drawbacks when using the spade drill because of its design. The hand drill creates torque which, in turn, gives place to drifting and wobbling.

These problems inspired the design of the drill guide apparatus. No longer is it necessary for the workman to rely solely on "eyeballing" the drilling to attempt a straight course through the material. In order to avoid the pitfalls of drift and wobble, this invention utilizes four separate guides that are assembled together. These, in turn, cause the drill to stay on a course that is both parallel and perpendicular. One of the four guides in this embodiment, the insert guide, stabilizes the drill, thus keeping it from wobbling. Another advantage is that the drill will keep its edge life longer due to the flow of cut being even. In order to operate the system properly, there is only one requirement. The shaft size of the spade drill and the shaft size of one drill extension rod must enable the enjoined tools to fit inside the insert guide. While the spade drills are customarily manufactured with a standard shaft size of $\frac{5}{32}$". The drill extension rods are manufactured with no set standard. When a drill extension rod that has a $\frac{5}{32}$" shaft is utilized, it will fit into the insert guide. If you need to drill deeper than the one drill extension rod, you would simply add other drill extension rods to the one that fits into the insert guide. In addition, you have the option of manufacturing the insert guides to fit any size shaft you like. As for the drill extension rod, the end that goes in the hand drill side is usually the same size as the shaft while the other end is designed to accept a shaft size of about $\frac{5}{32}$". The outside head diameter is about $\frac{1}{2}$" tapering to the shaft size. With the $\frac{5}{32}$" hole being about $\frac{3}{4}$" deep in the end of the drill extension rod, there is a second requirement. The drilled hole has to be larger than the head diameter of the drill extension rod, for the $\frac{1}{2}$" diameter to fit into the drilled hole. If the drill extension rod would not fit, another alternative could be to manufacture the drill extension rod with a smaller head diameter. This drill extension rod would fit smaller spade drill sizes. And, once again, a spade drill is defined as a drill having a cutting edge larger than its shaft (shank).

SUMMARY OF THE INVENTION

This invention relates to a drill guide apparatus with four separate guides assembled together. By using this invention (embodiment), the drill guide apparatus, a spade drill is enabled to stay on a parallel and perpendicular course. One of the four guides (the insert guide), stabilizes the drill which, in turn, keeps the drill from wobbling. Another benefit of the invention is that the drill will keep its edge life longer due to the even flow of cut. The insert guide is made to be $\frac{1}{32}$" of an inch smaller than the spade drill diameter. This allows the insert guide to enter into the hole without binding. The base plate, to which all the components are attached, is designed to be perpendicular with the spade drill. This allows the spade drill to follow the course in the perpendicular while the insert guide keeps the spade drill stable. Since the insert guide fits snugly; the guide rod and the spacer will set a course that is parallel as well as perpendicular. The guide rod aligns with the work piece, and the spacer will lay up against the work piece once the spade drill has gone into the hole to a predetermined depth. A $\frac{1}{4}$" bolt detaches the spacer from the base plate. The spacer is designed to slide over the guide rod, insert guide and the spade drill as well. At this time, the base plate lays up against the work piece and remains at the work piece until the desired depth is reached. The only time there is an exception is when you are required to add a drill extension rod. When this becomes necessary, the worker simply takes the spade drill out of the hand drill and slides the apparatus onto the drill extension rod. Then, the spade drill attaches to the proper end of the drill extension rod. Afterward, the spade drill is placed back in the hole, and drilling continues. The primary purpose of the invention is to make a hole that is parallel and perpendicular to the work piece. A secondary goal is to keep the hole from being out of round. An indispensable advantage is that the apparatus utilizes spade drills and drill extension rods readily available on the market. Notable among the many advantages of this embodiment is that just about anyone with little or no experience in carpentry can make accurate holes in wood and other material by merely following the simple directions.

In some embodiments of the present general inventive concept, a guide assembly for guiding a spade drill as it drills a hole includes a base plate having at least five holes, four of those holes being threaded, a spacer having four unthreaded holes and one threaded hole, each of the holes in the spacer aligning with a corresponding hole in the base plate, a bolt received in the unthreaded hole in the base plate and the threaded hole in the spacer for removably connecting the base plate and spacer, two insert guides for receiving shanks of spade drills, the insert guides being slidably received within corresponding unthreaded holes in the spacer, the outer diameter of each insert guide being smaller than the diameter of a hole drilled by a corresponding spade drill, with the outer diameter of the insert guide permitting the insert guide to fit snugly within a hole drilled by the outer diameter of the spade drill, each of the guide inserts having threads for connection within corresponding threaded holes in the spacer, and two guide rods having threaded ends to connect with corresponding threaded holes in the base plate.

BRIEF DESCRIPTION OF THE DRAWINGS

The above-mentioned and additional features of the invention will become more clearly understood from the following detailed description of the invention read together with the drawings in which:

FIG. 6b is a top view of the spacer shown in FIG. 6a;

DETAILED DESCRIPTION

Figure 1:
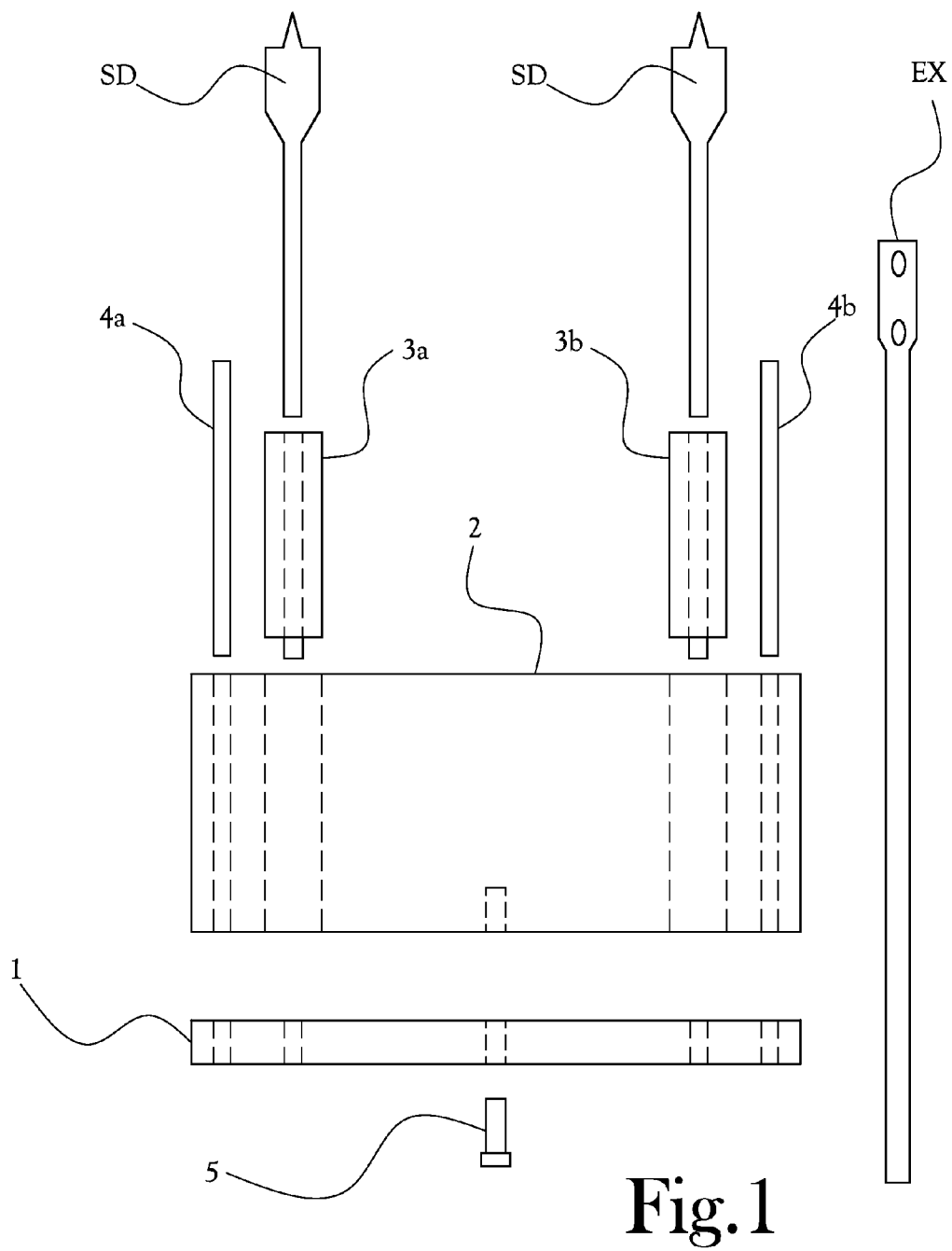
FIG. 1 is a view of several parts of an example apparatus embodiment of the invention before being assembled.
Figure 2:
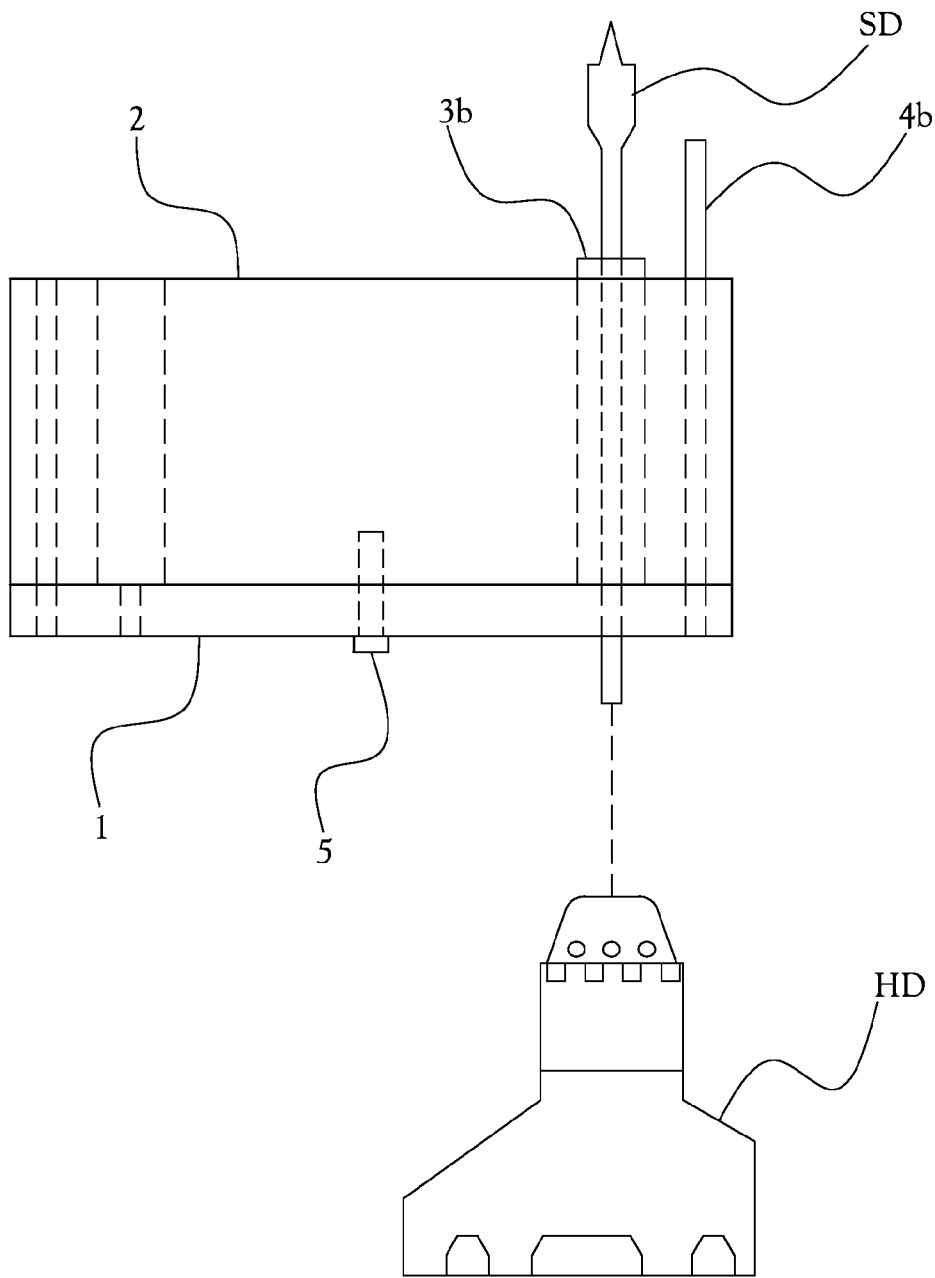
FIG. 2 is a view of an assembled apparatus together with an insert guide.

The drill guide apparatus is a combination of four separate guides assembled together to form the embodiment. FIG. 1 shows all the parts before being assembled. Representing one size of the insert guide is 3a, while 3b is representing a different size. Understandably only one or the other is used at a time. One would be used for a larger size drills, and the other for a smaller size drills. The duplicated guide rods 4a and 4b show that the choice is up to the worker to pick the hole that will align up to the work piece tightly. FIG. 2 shows the apparatus assembled together with insert guide 3b and guide rod 4b, the spacer 2, the base plate 1 and the bolt 5.

Figure 3:
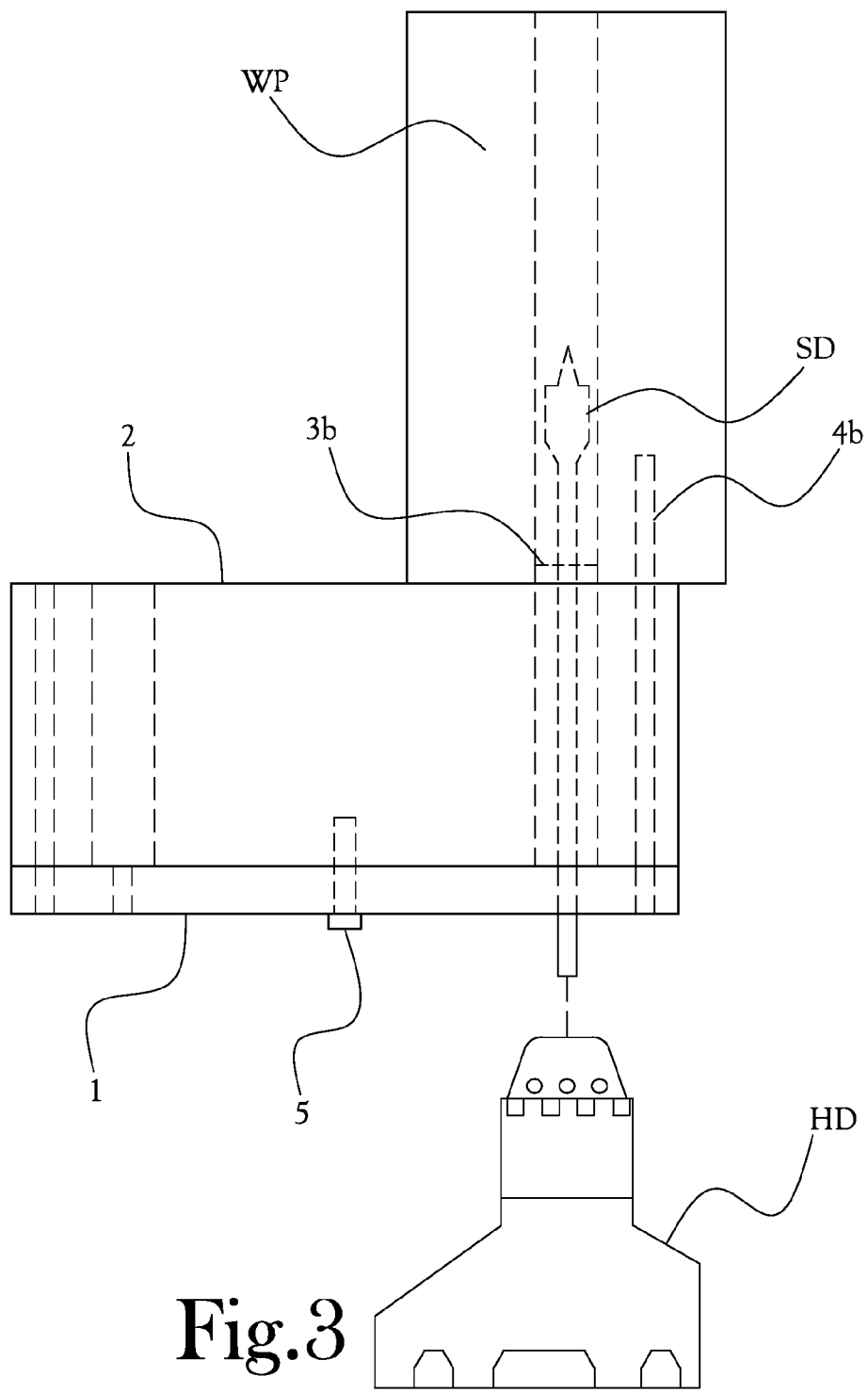
FIG. 3 is a view showing the apparatus aligned to the work piece.
Figure 4:
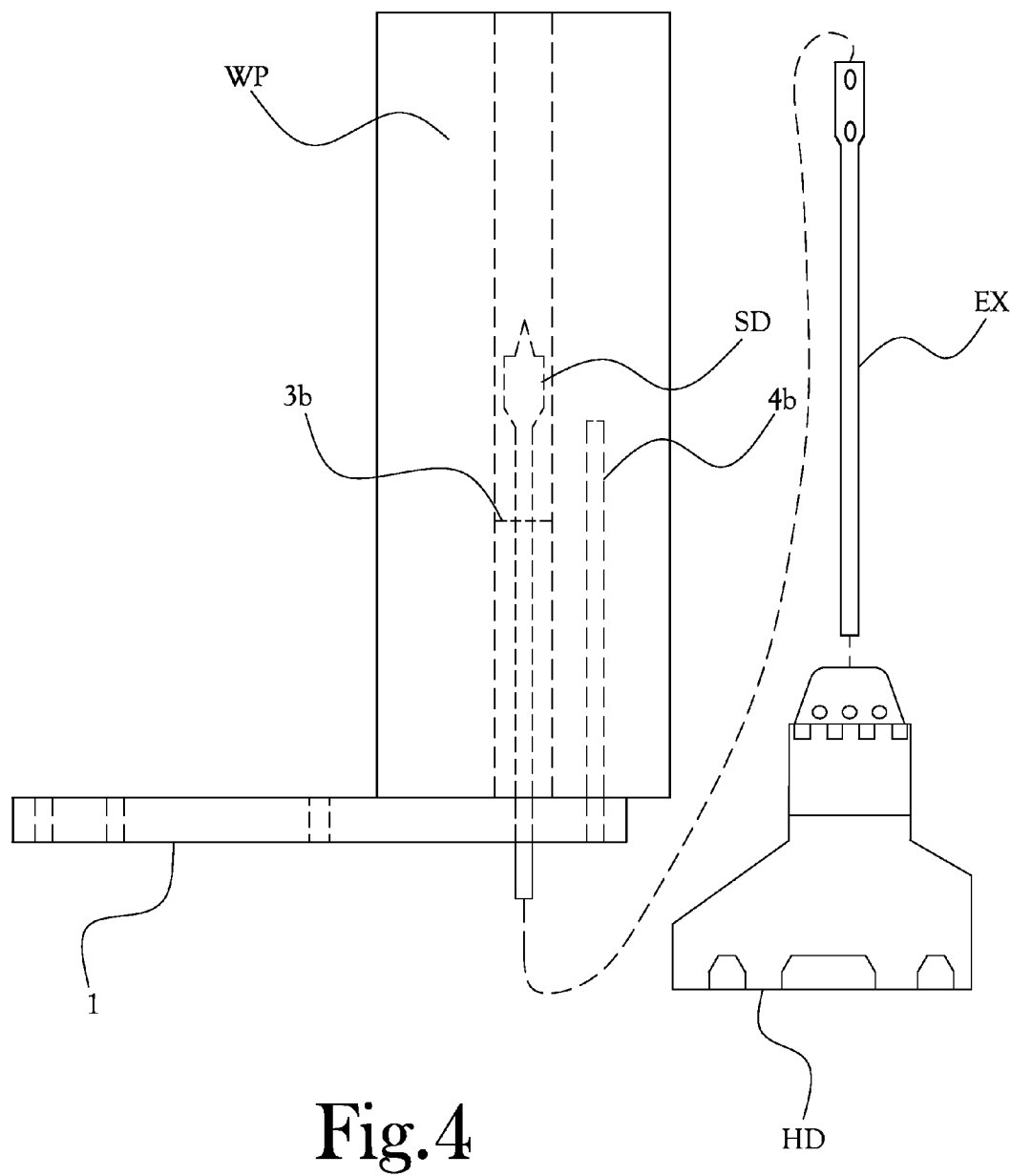
FIG. 4 is a view showing the spaces disconnected and slid over the guides.
Figure 5A:
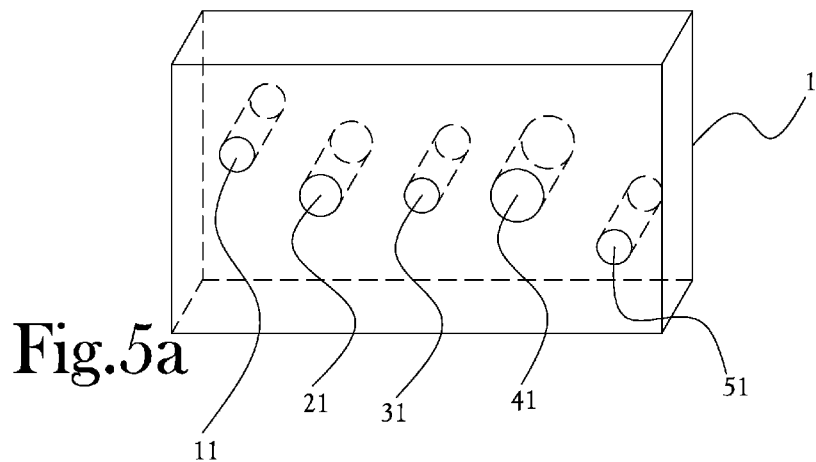
FIG. 5a is a perspective view of the base plate of the illustrated example embodiment, showing the hole pattern.
Figure 5B:
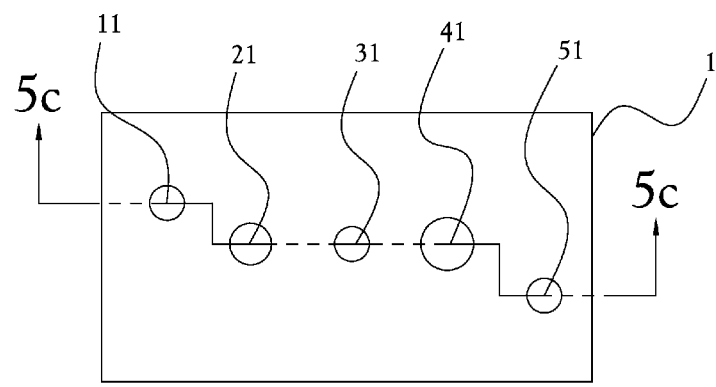
FIG. 5b is a top view of the base plate shown in FIG. 5a, showing the section line along which the view in FIG. 5c is taken.
Figure 5C:
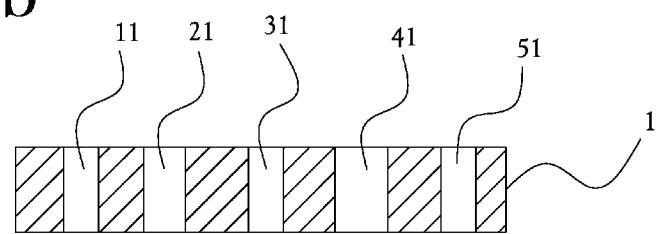
FIG. 5c is a section view of the base plate shown in FIGS. 5a and 5b.
Figure 6A:
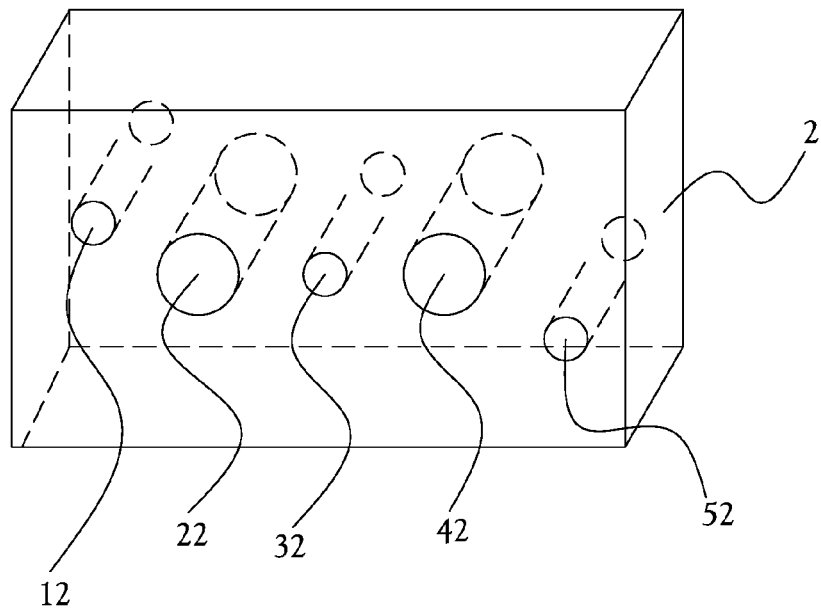
FIG. 6a is a perspective view of the spacer of the illustrated example embodiment.
Figure 6B:
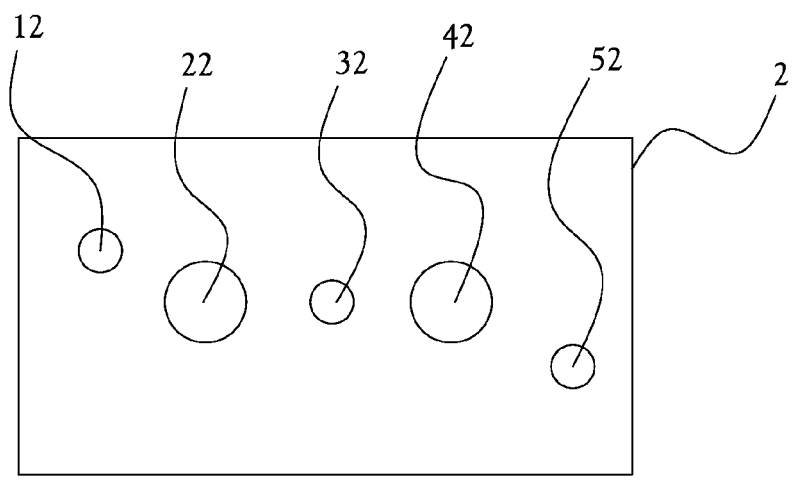
Figure 7A:
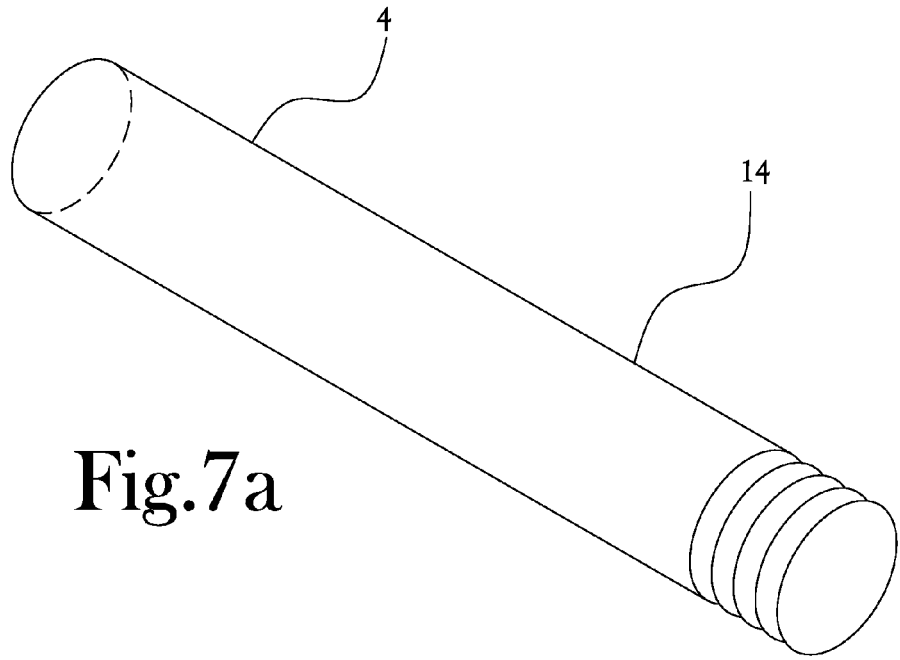
FIG. 7a is a view of the guide rod.
Figure 7B:
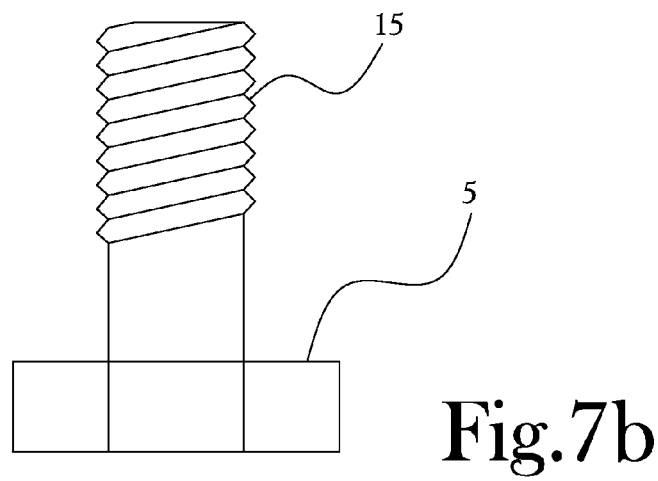
FIG. 7b is a view of the bolt.
Figure 8A:
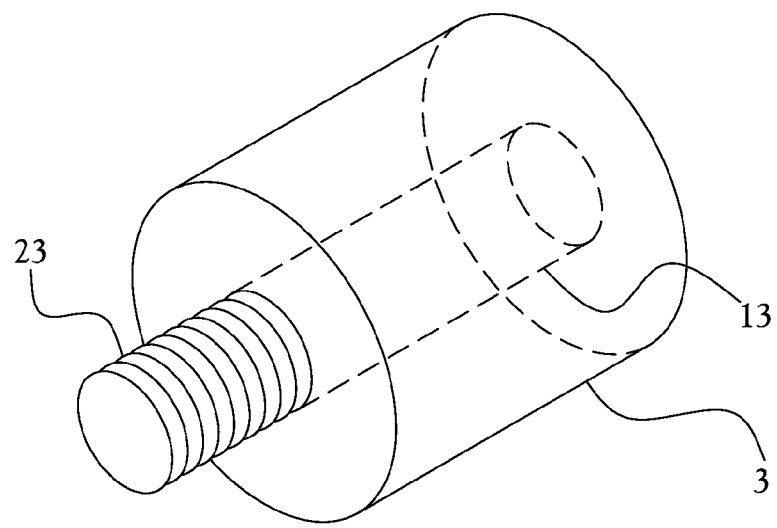
FIG. 8a is first view of the insert guide.
Figure 8B:
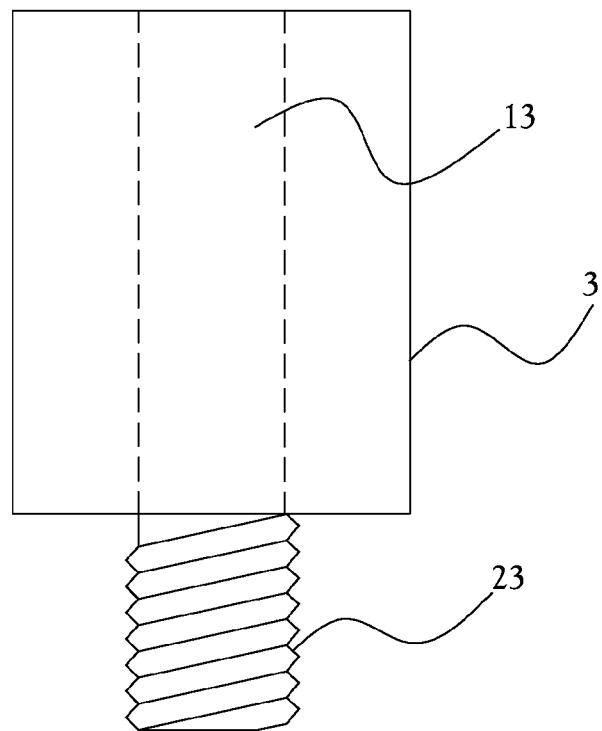
FIG. 8b is a second view of the insert guide.

The bolt 5 connects the spacer 2 to the base plate 1. Now the apparatus is in ready position. It should be noted that the spade drill (sd) and the hand drill (hd) only need to be connected with the proper insert guide 3 b as well as to the proper spade drill (sd) size. The insert guide 3b is slightly smaller in diameter than the spade drill (sd), thus allowing the insert guide 3b to enter into the drilled hole. The guide rod 4b is screwed into the base plate 1 on either side making it line up against the work piece (wp). With the insert guide 3b and the guide rod 4b in place, the spacer 2 is slid over both. Then the spade drill (sd) is attached to the hand drill (hd). As the hole is drilled, it becomes obvious that if a deeper hole than the length of the spade drill (sd) is needed, a drill extension rod (ex) must be utilized. The procedure to do so, is to disconnect the spade drill (sd) from the hand drill (hd) and attach the spade drill (sd) to the proper end of the drill extension rod (ex). Now, the apparatus is ready to be slid through the shaft of the drill extension rod (ex). It appears that most of the spade drills (sd) have a set standard shaft size (5/32") while the drill extension rods (ex) do not. It is noteworthy to add that the insert guides 3 can be manufactured to fit any shaft size. Another crucial fact is that only one drill extension rod (ex) is required to fit into the hole of the insert guide 3. When a longer hole is necessary, it is a simple matter to add a drill extension rod (ex) to the one drill extension rod (ex) that fits into the insert guide 3, yet there is but one more requirement and that being of the drill extension rod (ex) end that houses the spade drill (sd) it would appear that the diameter of that one particular end is approximately ½" in diameter which in turn requires a drill size of over a ½" in order for the end of the drill extension rod (ex) to fit in the hole, FIG. 3 is showing the apparatus aligned to the work piece at stage 1. In this, the first stage, the spacer 2 is used. Place the point of the spade drill (sd) where the hole is to be made and begin drilling. What will take place is the spade drill (sd) will start to make the hole. Then, after a certain depth has been drilled, the insert guide 3 will enter into the hole ¼"; and the spacer 2 will lay up against the work piece (wp). At this point, the worker continues to drill one full inch deeper into the hole. Now the apparatus may be removed along with any chips which may have gathered. While the apparatus is out, the spacer 2 is disconnected and slid over the two guides as shown in FIG. 4. Now the base plate 1 will lay up against the work piece (wp) when put back into the hole. The worker will continue to drill until the desired depth is reached, or until the hand drill (hd) comes in contact with the back of the base plate 1. If more depth is required, one or more drill extension rods (ex) will be attached to the original drill extension rod (ex); and drilling will continue. FIG. 5 shows the hole pattern for the base plate 1. In base plate 1, hole 31 functions as a clearance hole for bolt 5. Holes numbered 11 and 51 are for the guide rod 4 while hole 21 is for the smaller insert guide 3a. Hole number 41 is for the larger insert guide 3b. While the base plate 1 should be made of a metallic material. FIG. 6 is showing the hole pattern of the spacer 2, hole 32 is the only hole that is threaded for bolt 5, holes 12 and 52 are clearance holes for the guide rod and hole 22 is a clearance hole for the smaller insert guides and hole 42 is for the larger insert guides. FIG. 7 is pointing out that the guide rod 4 is a threaded shaft, and bolt 5 is a standard bolt used to attach the spacer 2 to the base plate 1. FIG. 8 is two views of the insert guides 3. These represent 3a and 3b, the smaller and the larger ones. The diameters will vary due to the fact that the insert guides 3 must be matched to the spade drills (sd). Once to the fact that the insert guides 3 must be matched to the spade drills (sd) again, the proper diameter size of the insert guide 3 will be slightly smaller than the diameter of the spade drill (sd). In addition, the hole through the center of the insert guide 3 has to match up with the shaft size with a minimal amount of play. Once again, there is the option to manufacture the insert guides 3 to fit the shaft size of both the spade drill (sd) and the drill extension rod (ex). The outside threaded end of the insert guide 3a is designed for smaller spade drill (sd) diameters. Insert guide 3b is threaded for larger spade drill (sd) diameters. The reason for the two different size threads is that the diameter of the thread on the larger insert guide 3b would be larger than the diameter of insert guide 3a. For example, a ½" thread size would be larger in its diameter than a ¼" thru ⁷⁄₁₆" insert guide 3a. The insert guide 3a would unscrew thru the backside because of the insert guide not being able to be seated. Henceforth, the worker must use a thread size small enough to allow the insert guide 3a to be seated.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A guide assembly for guiding a spade drill as it drills a hole, comprising:

a base plate having at least five holes, four of those holes being threaded;

a spacer having four unthreaded holes and one threaded hole, each of the holes in the spacer aligning with a corresponding hole in the base plate;

a bolt received in the unthreaded hole in the base plate and the threaded hole in the spacer for removably connecting the base plate and spacer;

two insert guides for receiving shanks of spade drills, the insert guides being slidably received within corresponding unthreaded holes in the spacer, the outer diameter of each insert guide being smaller than the diameter of a hole drilled by a corresponding spade drill, with the outer diameter of the insert guide permitting the insert guide to fit snugly within a hole drilled by the outer diameter of the spade drill, each of the guide inserts having threads for connection within corresponding threaded holes in the base plate; and two guide rods having threaded ends to connect with corresponding threaded holes in the base plate.

\* \* \* \* \*